(12) United States Patent
Kujirai

(10) Patent No.: US 9,349,078 B2
(45) Date of Patent: May 24, 2016

(54) JOB MANAGEMENT SYSTEM, IMAGE FORMING APPARATUS, CONTROL METHOD, AND STORAGE MEDIUM

(71) Applicant: CANON KABUSHIKI KAISHA, Tokyo (JP)

(72) Inventor: Yasuhiro Kujirai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/600,343

(22) Filed: Jan. 20, 2015

(65) Prior Publication Data
US 2015/0220817 A1    Aug. 6, 2015

(30) Foreign Application Priority Data

Feb. 4, 2014   (JP) ................................. 2014-019764

(51) Int. Cl.
| | |
|---|---|
| *G06K 15/02* | (2006.01) |
| *G06F 3/12* | (2006.01) |
| *H04N 1/00* | (2006.01) |
| *G06K 15/00* | (2006.01) |
| *H04N 1/23* | (2006.01) |
| *H04N 1/32* | (2006.01) |

(52) U.S. Cl.
CPC ............ *G06K 15/021* (2013.01); *G06F 3/1203* (2013.01); *G06F 3/1273* (2013.01); *G06K 15/4065* (2013.01); *H04N 1/00344* (2013.01); *H04N 1/00832* (2013.01); *H04N 1/2323* (2013.01); *H04N 1/32122* (2013.01); *H04N 2201/0094* (2013.01); *H04N 2201/3202* (2013.01)

(58) Field of Classification Search
None
See application file for complete search history.

(56) References Cited

U.S. PATENT DOCUMENTS

| | | | |
|---|---|---|---|
| 6,922,260 B2 | 7/2005 | Nishikawa | |
| 6,927,865 B1 | 8/2005 | Kujirai | |
| 6,965,953 B2 | 11/2005 | Kujirai | |
| 7,002,707 B2 | 2/2006 | Kujirai | |
| 7,064,849 B1 | 6/2006 | Nishikawa | |
| 7,084,995 B2 | 8/2006 | Mori | |
| 7,131,775 B2 | 11/2006 | Uchida | |
| 7,168,868 B2 | 1/2007 | Uchida | |
| 7,280,245 B2 | 10/2007 | Nishikawa | |
| 7,474,439 B2 | 1/2009 | Uchida | |
| 7,499,196 B2 | 3/2009 | Nakata | |
| 7,589,862 B2 | 9/2009 | Uchida | |
| 7,609,401 B2 | 10/2009 | Kujirai | |
| 7,940,403 B2 | 5/2011 | Uchida | |

(Continued)

FOREIGN PATENT DOCUMENTS

| | | | |
|---|---|---|---|
| JP | 2002-149375 | | 5/2002 |
| JP | 2008062518 A | * | 3/2008 |

*Primary Examiner* — Thomas D Lee
(74) *Attorney, Agent, or Firm* — Fitzpatrick, Cella, Harper & Scinto

(57) ABSTRACT

An image forming apparatus of a job management system associates a paper brand identifier with a paper name to record a number of sheets of paper used in an executed job for each paper brand identifier as a job history, and notifies the management system about identifying information for identifying the latest job history and the updated paper brand and the paper brand identifier. The management system manages an association between the paper brand identifier and the paper name of the image forming apparatus to count the number of sheets of paper used for each paper name before the update by using the job history information and the identifying information.

10 Claims, 16 Drawing Sheets

(56) References Cited

U.S. PATENT DOCUMENTS

| | | |
|---|---|---|
| 8,009,303 B2 | 8/2011 | Kujirai |
| 8,009,304 B2 | 8/2011 | Uchida |
| 8,049,928 B2 | 11/2011 | Uchida |
| 8,189,212 B2 | 5/2012 | Uchida |
| 8,497,999 B2 | 7/2013 | Kujirai |
| 8,775,313 B2 | 7/2014 | Kujirai |
| 2007/0296748 A1* | 12/2007 | Oki ........................ B41J 11/485 347/14 |
| 2013/0335768 A1 | 12/2013 | Kujirai |
| 2015/0015916 A1* | 1/2015 | Kikuchi ............. G06K 15/1848 358/3.24 |

* cited by examiner

FIG. 6

| | | 604 |
|---|---|---|
| 601 | Basic information (Job information, user information, and document information) | Job identification number |
| | | User name |
| | | Document name |
| | | Print start date and time |
| | | Print termination date and time |
| 602 | Print setting information | Color mode |
| | | Page layout |
| | | Two-sided printing/ One-sided printing |
| | | Number of copies |
| 603 | Output information | Colored page number and a number of the paper for each paper brand ID (A4) |
| | | Monochrome page number and a number of the paper for each paper brand ID (A4) |
| | | Colored page number and a number of the paper for each paper brand ID (A3) |
| | | Monochrome page number and a number of the paper for each paper brand ID (A3) |
| | | |

| Paper brand ID | Paper name | Weight (g/m$^2$) | Surface properties |
|---|---|---|---|
| 00000100 | XX-paper-Normal | 90 | Glossy paper |
| 00000101 | YY-paper-Thick | 120 | Matted |
| 00000140 | ZZ-paper-Thick | 115 | Recycled paper |
| 00000150 | AA-Normal | 90 | : |
| 00000151 | BB-paper-Thick | 110 | : |
| 00000152 | CC-paper-Normal | 80 | : |
| : | : | : | : |

| Paper-feed | Paper size | Paper type | Paper brand ID |
|---|---|---|---|
| Drawer 1 | A4 | Plain paper | 00000100 |
| Drawer 2 | A4 | Plain paper | 00000101 |
| Drawer 3 | A3 | Cardboard | 00000140 |
| Drawer 4 | A4 | Recycled paper | 00000150 |
| Pedestal | A4 | Recycled paper | 00000151 |

| Device | Paper name | Paper type |
|---|---|---|
| Device-A | XX-paper-Normal | Plain paper |
| Device-A | YY-paper-Thick | Cardboard |
| Device-A | ZZ-paper-Thick | Recycled paper |
| Device-A | : | : |
| Device-B | AA-Normal | Plain paper |
| Device-B | BB-paper-Thick | Cardboard |
| Device-B | : | Recycled paper |
| Device-B | : | : |

JOB MANAGEMENT SYSTEM, IMAGE FORMING APPARATUS, CONTROL METHOD, AND STORAGE MEDIUM

BACKGROUND OF THE INVENTION

1. Field of the Invention

The present invention is related to a job management system for collecting information about a job executed by an image forming apparatus, the image forming apparatus, a control method, and a storage medium.

2. Description of the Related Art

A system for collecting each type of a job history executed by an image forming apparatus represented by a printer or a multi-function peripheral has been commonly used to count and analyze a result of a utilization state of the job. These job histories comprise paper information such as paper size (A4, A3, and the like) and paper type (plain paper, cardboard and the like). The system can count the number of the printed pages of the paper and the number of the sheets of printed paper for each paper size or each paper type.

A variety of paper types are used in the image forming apparatus, and to perform an optimal image formation, the variety requires adjustments in response to the characteristics of the printing for each paper type. For example, since the weight and surface properties of a paper vary depending on the paper brand even if the papers is classified as "plain paper", there is a need for the adjustment in response to the characteristics of the printing by using a parameter more detailed than the paper type. Recent image forming apparatuses hold the parameters required in adjusting the characteristics of the printing for each piece of the paper information to enable reading the parameter corresponding to the designated paper information during printing to print the paper with the optimal characteristics of the printing.

The paper information designated during printing can be designated from an operation unit of the image forming apparatus or a computer. Also, a user can register the paper information to the image forming apparatus by applying a paper name to simplify the designation of the paper type for use in printing. This kind of circumstance leads to an increase in demand for the counting for each paper brand used in the printing, in addition to the counting for each paper type. A name for the paper brand that is called "paper name" can define information about a sufficient number of characters to assure the identification by the user. Japanese Patent Laid-Open No. 2002-149375 discloses a system for managing a result of an execution of the job for each paper type by adding the detailed paper information to the job history after the processing of the printing.

However, if the image forming apparatus adds the paper name information to the job history as described above, the size of the data increases to increase a load of the system. Also, if the detailed paper information is updated in inquiring the job history at regular interval, the content of the job history executed within the interval for inquiring will be incorrect.

In particular, in an environment in which a variety of output products such as a POD (Print On Demand) is handled, the used paper type mostly varies depending on each job to cause the frequent switching of the paper in the image forming apparatus. Therefore, the registration of the paper information used in the printing is frequently performed in the image forming apparatus. The paper information can be registered from the operation unit of the image forming apparatus. The paper information registered in the image forming apparatus is managed by a paper brand identifier (paper brand ID) issued within the image forming apparatus. Therefore, in an environment to which a plurality of image forming apparatuses are connected, the papers with the same type are managed by the different paper brand IDs respectively in the image forming apparatuses.

Also, the paper information can be registered from a computer or the like connected to the image forming apparatus via a network. In this case, the paper brand ID managed within the image forming apparatus is transmitted from the computer to enable managing the same paper brand by the identical paper brand ID in the image forming apparatus. However, the above processing may cause overwriting of another paper brand ID previously used in the image forming apparatus. In other words, the meaning of the paper brand ID before the overwriting may be different from that after the overwriting.

SUMMARY OF THE INVENTION

The present invention provides a job management system that enables correctly counting a job log for each paper brand, even if the detailed paper information is changed.

According to an embodiment of the present invention, a job management system that includes an image forming apparatus and a management system for managing job history information is provided that the image forming apparatus comprises a managing unit configured to associate a paper brand identifier with a paper name to be managed in a database; a recording unit configured to record a number of sheets of paper used in a job executed by the image forming apparatus for each paper brand identifier as a job history; a first notifying unit configured to notify the management system about identifying information for identifying the latest job history in a plurality of job histories recorded by the recording unit in updating a corresponding relationship between the paper brand identifier and the paper name in the database; a second notifying unit configured to notify the management system about the updated paper name and the paper brand identifier; and a transmitting unit configured to transmit the job history information with the plurality of job histories recorded by the recording unit to the management system, and the management system comprises a managing unit configured to associate the paper name with the paper brand identifier of the image forming apparatus to be managed based on a notification from the image forming apparatus; and a counting unit configured to count the number of sheets of paper used for each paper name before the update by using the job history information and the identifying information.

According to the job management system of the present invention, a job log for each paper brand can be counted correctly, even if the detailed paper information is changed.

Further features of the present invention will become apparent from the following description of exemplary embodiments (with reference to the attached drawings).

BRIEF DESCRIPTION OF THE DRAWINGS

FIG. 6 is an example of job history information according to a first embodiment.

DESCRIPTION OF THE EMBODIMENTS

Hereinafter, a detailed description will be given of preferred embodiments of the present invention with reference to drawings. Also, the following embodiments are not intended to limit the claims, and all of the combinations of the characteristics illustrated in the embodiments below are not absolutely necessary for solution by the present invention.

First Embodiment

Figure 1:
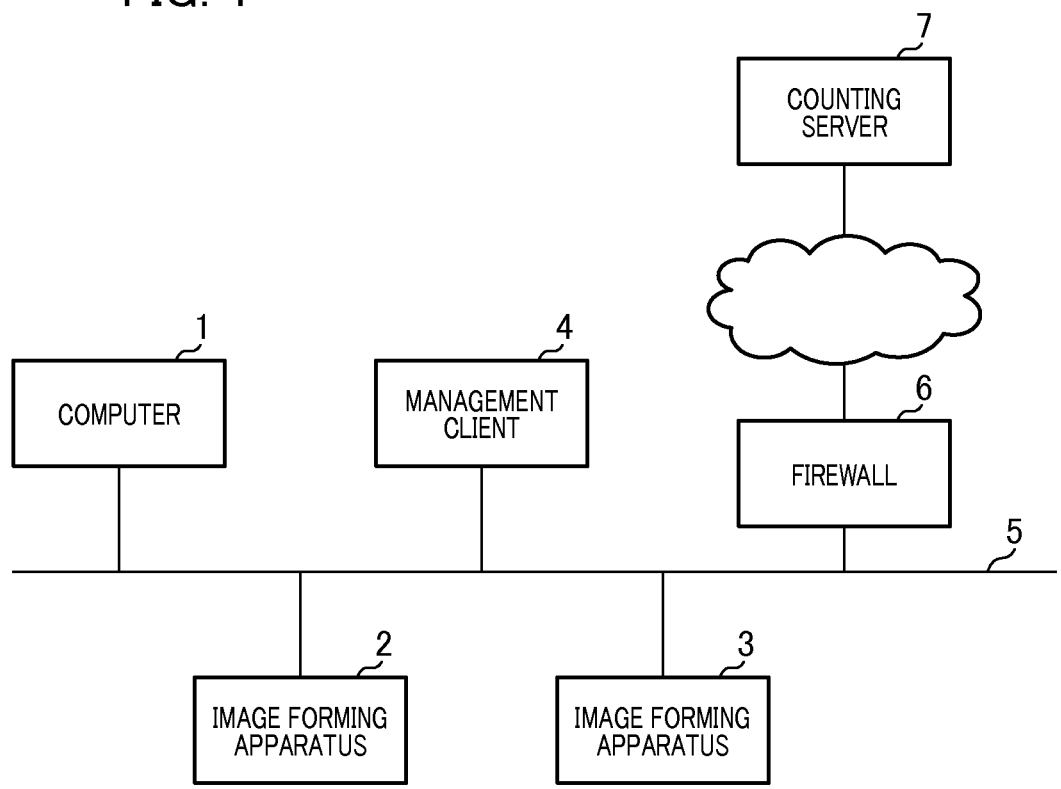
FIG. 1 is a diagram illustrating an exemplary configuration of a job management system according to an embodiment of the present invention.

FIG. 1 is a block diagram illustrating an exemplary configuration of a job management system according to the present invention. The job management system shown in FIG. 1 comprises a computer 1, image forming apparatuses 2 and 3, a management client 4, firewall 6, and a counting server 7. The computer 1, the image forming apparatus 2, the image forming apparatus 3, and the management client 4 are communicably connected each other by using known techniques such as Ethernet (registered trademark). Also, the counting server 7 is connected to the Internet and the management client 4 is connected to the counting server 7 via the firewall 6. Note that the counting server 7 may be in a form that is connected to the Intranet via the network 5.

The computer 1 is used by a user. The computer 1 has a function for generating an image data by an operation of the user and a printing instruction being performed by the image forming apparatuses 2 and 3. Also, the computer 1 may comprise a function for registering paper information managed by the image forming apparatuses 2 and 3 via the network 5.

The image forming apparatuses 2 and 3 are devices for receiving printing data received via the network 5 and performing printing on actual paper by using a known printing technique such as an electrophotographic technique, an inkjet technique, or the like. Also, the image forming apparatuses 2 and 3 have functions for reading a paper original via a scanner, copying the paper original, and transmitting an image data via an Email or the like by converting the paper original into the image data. The image forming apparatuses 2 and 3 may have only a function for the printer without that for the scanner. Also, the image forming apparatuses 2 and 3 can be connected to the management client 4 each other via the network 5.

The management client 4 acquires the history of each job, such as the printing, the copying, and the transmitting with the Email performed by the image forming apparatuses 2 and 3. Also, the management client 4 acquires the paper information managed by the image forming apparatuses 2 and 3 via the network 5. In addition, the management client 4 transmits the job history and the paper information acquired from the image forming apparatuses 2 and 3 to the counting server 7. The counting server 7 counts a utilization state based on the job history and the paper information acquired from the management client 4.

Figure 2:
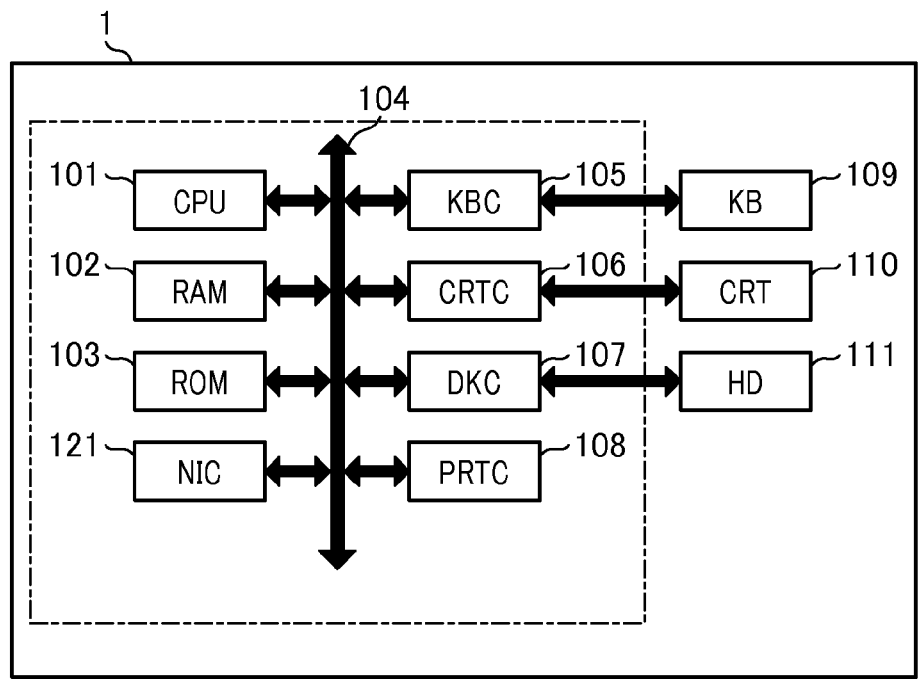
FIG. 2 is a diagram illustrating an exemplary configuration inside of a host computer.

FIG. 2 is a block diagram illustrating an exemplary configuration of hardware of the computer 1. Hardware configurations of the management client 4 and the counting server 7 are similar to that of the computer 1, and thus, a description thereof will be omitted. The computer 1 comprises a CPU 101 to a HD 111. The CPU 101 to a PRTC 108 can transmit/receive a data with each other via a bus 104. The CPU 101 performs processing for a document comprising a figure, an image, a text, and a table (including a spreadsheet and the like) based on a document processing program stored in a ROM for programs of a ROM 103 or an external memory 111.

Also, the ROM for programs of the ROM 103 or the external memory 111 stores an operating system program (Hereinafter, referred to as an "OS") and the like. In addition, the ROM 103 or the external memory 111 stores each type of data used in performing the processing for documents such as a font data. A RAM 102 functions as a main memory of the CPU 101, a work area and the like. Note that CPU, the ROM, and the RAM respectively stand for "Central Processing Unit", "Read Only Memory", and "Random Access Memory".

A keyboard controller (KBC) 105 controls a key input from a keyboard 109 or a pointing device (not shown). A CRT controller (CRTC) 106 controls a display of a CRT display (CRT) 110. A disc controller (DKC) 107 controls access to the external memory 111 such as a hard disc (HD) or a flexible disc (FD). The external memory 111 stores a boot program, various applications, the font data, a user file, an editing file, a printer control command generation program (hereinafter referred to as "printer driver"), and the like. The printer controller (PRTC) 108 is connected to the image forming apparatus 2 by the network via an interactive network interface (interface) 121 to execute processing for controlling communication with the image forming apparatus 2.

Also, the CPU 101 opens a variety of windows on the image registered depending on a command indicated by a mouse cursor or the like (not shown) on the CRT 110 to execute the processing for the various data. When a user executes the printing, the user opens the window related to the setting of the printing and performs the setting of the print processing method on the printer driver including a setting of the printer and the selection of the printing mode.

Figure 3:
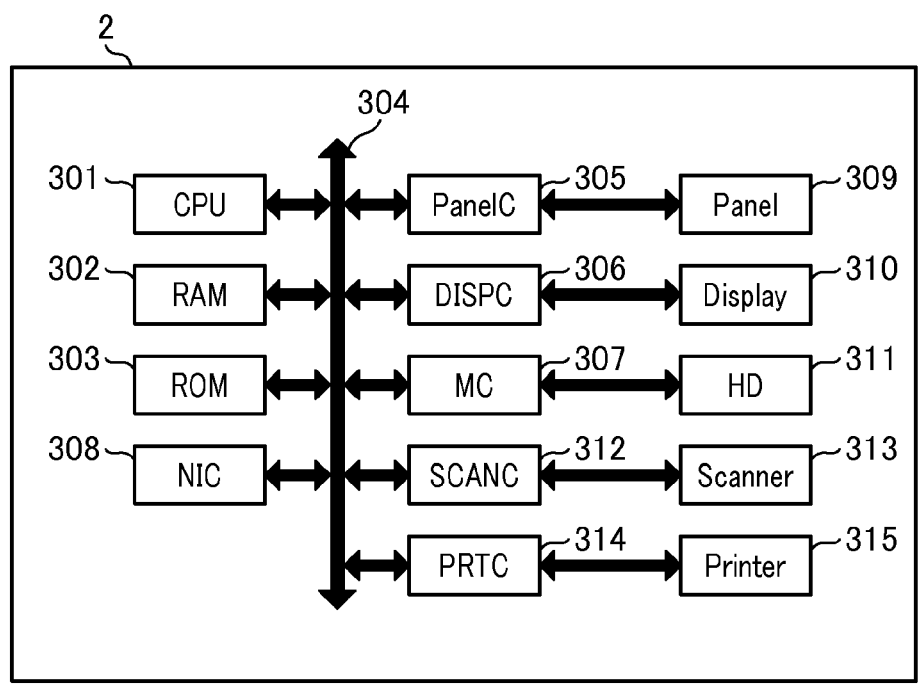
FIG. 3 is a diagram illustrating an exemplary configuration inside of an image forming apparatus.

FIG. 3 is a block diagram illustrating an exemplary configuration of hardware of the image forming apparatuses 2 and 3. Here, as one example, a description will be given of the image forming apparatus 2. The image forming apparatus 2 comprises a CPU 301 to a printer 315. The CPU 301 outputs an image signal as output information to a print unit (printer) 315 connected to a system bus 304 via a print control unit PRTC 314 based on a control program stored in a ROM 303 or a HD 311 that is an external memory. Also, a scan control unit 312 (SCANC) controls an optical scanner 313 equipped with the image forming apparatus 2 to read the paper original.

The CPU 301 can connect to the computer 1 via a network I/F 308 and notify the computer 1 about the information and the like in the image forming apparatus 2 to. A RAM 302 functions as a main memory of the CPU 301, work area, or the like. The RAM is configured to enable expanding memory capacity by an optional RAM connected to an expansion port (not shown). Note that the RAM 302 is used in an output information mapping area, an environment data storage area, NVRAM, and the like. The above external memory 311 such as the hard disc (HD) or the IC card is controlled by the access to a memory controller (MC) 307.

The external memory 311 is connected as an option and stores the font data, an emulation program, a form data, and the like. The external memory 311 is not always a single external memory, and a plurality of external memories may be configured to be connected. In addition, the external memory 311 may comprise a NVRAM (not shown), and store information about the setting of the printer mode from an operation panel 305. Also, a panel controller (PanelC) 305 controls an instruction input from an operation panel 309. A display controller 306 (DISPC) controls a display of a display module 310 (DISPLAY) configured by, for example, a liquid crystal display or the like.

Figure 4:
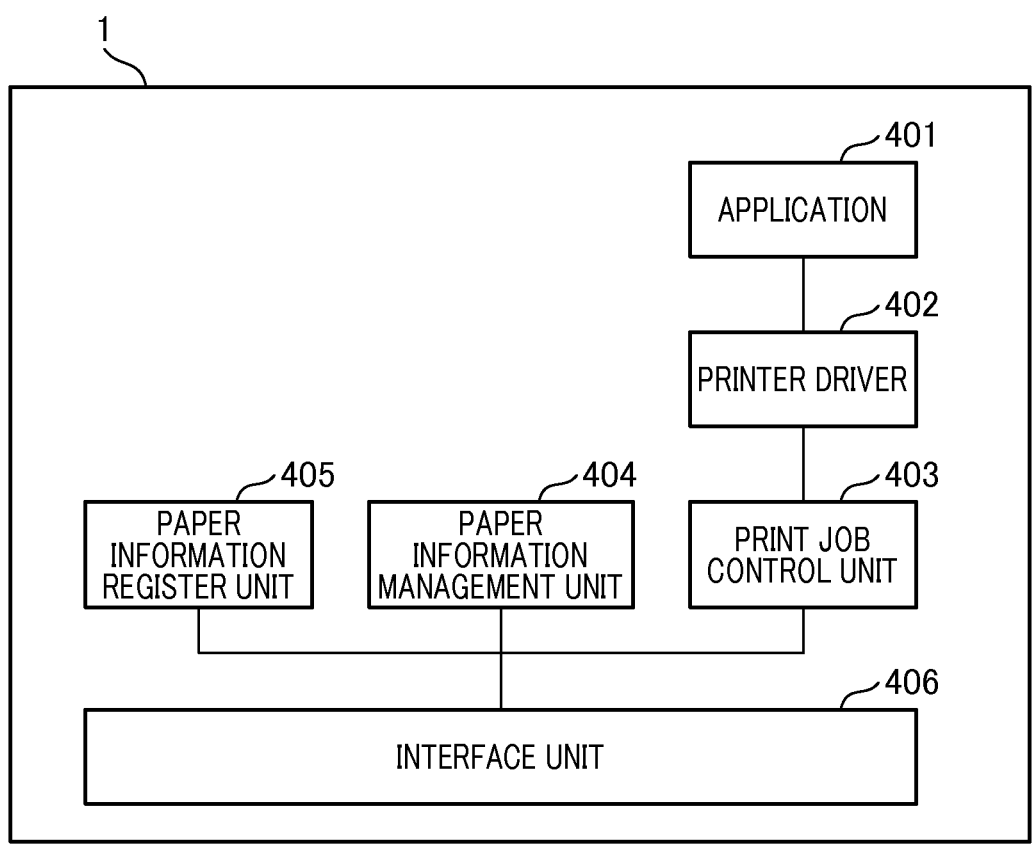
FIG. 4 is a diagram illustrating an exemplary configuration of software of the host computer.

FIG. 4 illustrates an exemplary configuration of a function of the computer 1. The computer 1 comprises an application 401, a printer driver 402, a print job control unit 403, a paper information management unit 404, a paper information register unit 405, and an interface unit 406. The application 401 transmits drawing instructions and the like to the printer driver 402 to perform printing instructions.

The printer driver 402 converts the drawing instruction received from the application 401 to printing data, which the image forming apparatus can interpret, and that is called PDL (Page Description Language). In addition, if device authentication is set, the printer driver 402 displays a user authentication dialog and prompts the user to input a user name and a password required to use the image forming apparatus. The printer driver 402 transmits the input user name and the password to the image forming apparatus as a print destination via the network 5, thereby issuing an authentication request.

The image forming apparatus 2 collates the user name and the password by using an authentication processing unit 512 as described below, and returns a success or failure result of the authentication. When the authentication has failed, the printer driver 402 cancels the printing, and when the authentication has succeeded, it creates a print job by appending the input user name to the print job as job owner information. The printer driver 402 creates the print job by appending the user name logged on to the computer 1 as the job owner information, if the device authentication is not set.

Next, the printer driver 402 transmits the created print job data to the print job control unit 403. The print job control unit 403 transmits the print job received by the printer driver to the image forming apparatus 2 via the interface unit 406.

Figure 5:
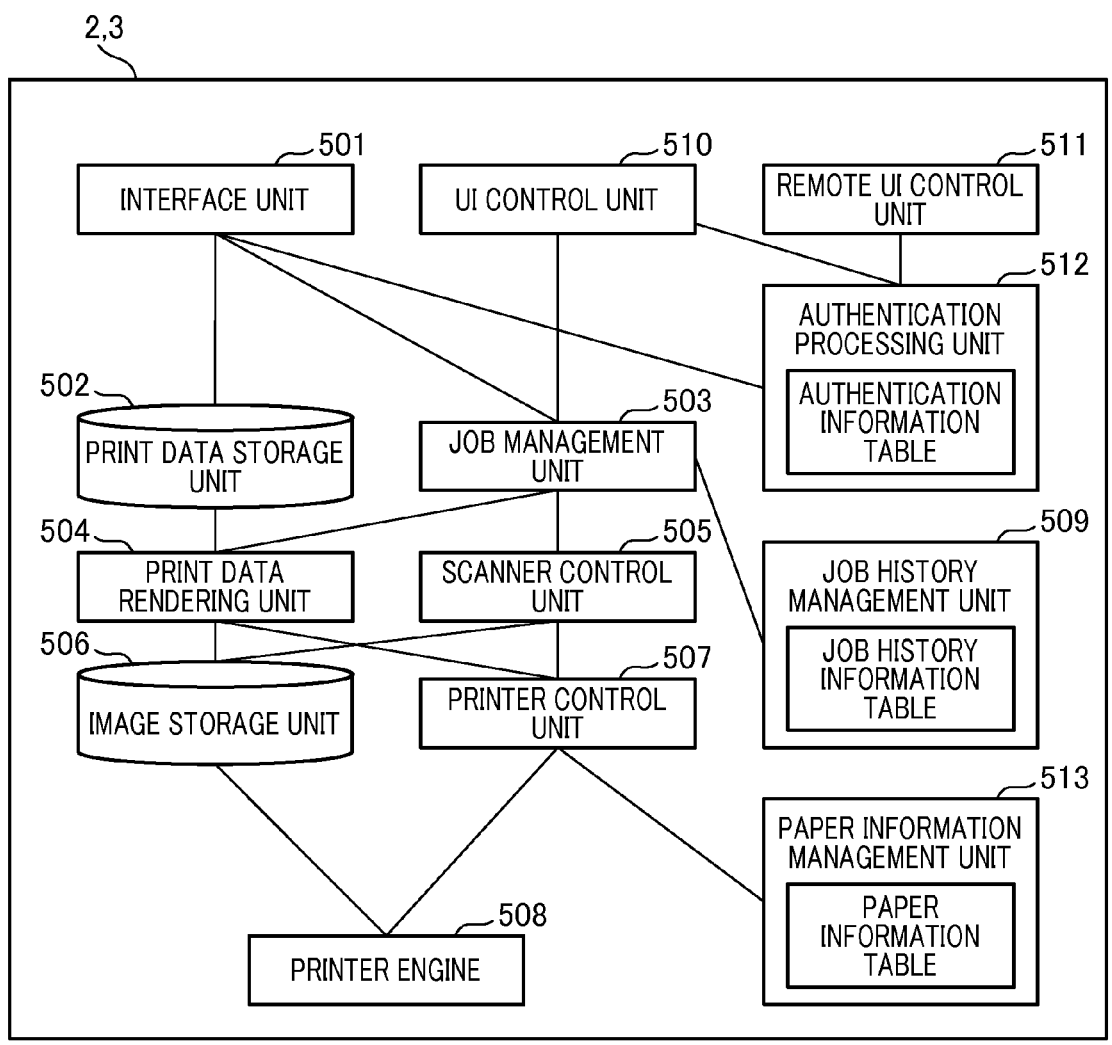
FIG. 5 is a diagram illustrating an exemplary configuration of software of the image forming apparatus.

FIG. 5 illustrates an exemplary configuration of a function for the image forming apparatuses 2 and 3. The image forming apparatuses 2 and 3 comprise an interface unit 501 to a paper information management unit 513. The interface unit 501 is connected to a network 5 to receive a print job from the computer 1 and provide the job history information and the paper information to the management client 4. Also, the interface unit 501 receives a request for acquiring device information from the management client 4 to transmit the device information such as recovery time information from the sleep mode, or engine speed information. A print data storage unit 502 temporarily stores the print job data to the RAM 302 or the hard disc 311 (HD) as shown in FIG. 3.

A UI control unit 510 controls the operation panel 309 via the panel controller 305 (PanelC) as shown in FIG. 3 and receives an instruction for the user's log-in request, a copy instruction, a scanning transmission instruction, and the like to the image forming apparatus 2. When the UI control unit 510 receives the user's log-in request, the UI control unit 510 transmits the information about the authentication such as the user name and the password, thereby issuing an authentication request. When the authentication has succeeded in the authentication processing unit 512, the UI control unit 510 receives an authentication ID. Next, the UI control unit 510 holds the user name and the authentication ID until it receives a logout request. When an issue of a job such as the copying is instructed by the operation of the user, the UI control unit 510 transmits the user name and the authentication ID together with the job issue request to a job management unit 503.

Also, the UI control unit 510 performs processing for logout when a logout operation is executed from the operation panel. The UI control unit 510 has a "timeout period" as operation setting information, and if the operation of the time set by the "timeout period" is not performed on the operation panel, logout processing is performed. A set value of the "timeout period" can be referred to from an external module (for, example, an analysis server or the like). In the logout processing, the UI control unit 510 performs a logout notification together with the user name, the authentication ID, and logout cause information to the authentication processing unit 512, and discards the authentication information and the authentication ID.

A remote UI control unit 511 functions as a HTTP server or a HTTPS server and receives a request from a web browser (not shown), which runs on the host computer 1 or the like. When the remote UI control unit 511 receives the request from the web browser, it acquires authentication information from session information, and inquiries whether or not access to the authentication processing unit 512 is permitted. If the access is permitted, the remote UI control unit 511 transmits a required HTML data to the web browser, and if the access is not permitted, it transmits the HTML data for displaying the image of a login form to the web browser. If the remote UI control unit 511 receives the input data from the web browser to the login form, it issues the authentication request to the authentication processing unit 512, and if the authentication has succeeded, transmits the required HTML data to the web browser.

The authentication processing unit 512 performs authentication processing and management of the image forming apparatus 2. The authentication processing unit 512 performs user authentication based on the login-name, the password or the like input to the operation panel 309 or the login form of the web browser of the image forming apparatus 2 by the user. Also, the authentication processing unit 512 receives the authentication request from the printer driver 402, collates the user name and the password, issues the authentication ID if the authentication is succeeded, and returns the ID to the operation panel 309 or the web browser together with the success or failure result of the authentication. The authentication processing unit 512 holds an authentication information table and performs the user authentication by comparing the input user name and the password with those registered in the table. Note that an authentication server (not shown) may be connected to use the authentication information table held at the side of the authentication server to perform the user authentication.

The job management unit 503 analyzes a print job to acquire a user name and output attribute information such as the number of copies to be printed and color settings, the paper type and the paper brand, and manages the acquired information together with a job start time as job information. When the user issues a job (for example, a print job) from the operation panel, the job management unit 503 receives the output attribute information, the user name, and the like from the remote UI control unit 511. And if the user issues the job from the web browser, the job management unit 503 receives it from the remote UI control unit 511.

A print data rendering unit 504 executes image generation processing by acquiring print data from the print data storage unit 502 in accordance with job information stored in the job management unit 503, thus generating image data. A scanner control unit 505 controls the scanner controller (SCANC) 312 in FIG. 3 to scan a paper original to generate image data. An image storage unit 506 temporarily stores the image data generated by the print data rendering unit 504 and the scanner control unit 505 to the RAM 302 and the hard disc (HD). A printer control unit 507 controls a printer engine 508 to print the image data stored in the image storage unit 506. The printer engine 508 is a printer device which actually prints the image data stored in the image storage unit 506 on a medium such as a print paper by using a known print technique such as an electrophotography technique or an ink-jet technique.

A job history management unit 509 manages job history information. When a job is completed, the job history management unit 509 receives the completed job information as the job history information from the job management unit 503, and then, stores the information. For example, the job history management unit 509 records the number of sheets of paper used in the executed job for each paper brand ID. The job history management unit 509 transmits the job history information in response to the request from the management client 4.

The paper information management unit 513 functions as a database for managing paper information used in the printing. For example, the paper information management unit 513 manages by associating a paper name with a paper brand identifier. The printer control unit 507 receives a registration instruction issued thorough the UI control unit 510 or the remote UI control unit 511, and updates a paper information table in the paper information management unit 513. Also, it can receive a registration instruction of the paper information from the computer 1, and updates the paper information table in the paper information management unit 513. The paper information management unit 513 transmits the paper information to the management client 4 in response to the request from the management client 4.

FIG. 6 illustrates one example of job history information managed by the job history management unit 509. The job history information illustrated in FIG. 6 comprises basic information 601, print setting information 602, and output information 603. A job history record is held in the job history information table of the job history management unit 509 as a job identification number 604 is a key, for each job identification number.

The basic information comprises the job identification number, the user name, a document name, a print start date and time, and a print termination date and time. Note that the storage mode and the storage order of the basic information are not limited to the mode as shown in FIG. 6. The job identification number 604 is a consecutive value uniquely issued in the image forming apparatus, and the value is used by the management client 4 to manage the processing history for each image forming apparatus. The print setting information 602 is transmitted together with the basic information 601 from the job management unit 503 during printing. The output information 603 stores information about a monochrome page number, and a number of sheets of paper for each paper brand ID and each paper size.

Figure 7A:
FIGS. 7A and 7B illustrate an example of paper information managed by a paper information management unit.
Figure 7B:

FIG. 7A is one example of paper information stored in the paper information table in the paper information management unit 513 according to the first embodiment. The paper information illustrated in FIG. 7A stores parameters required in the adjustment of the characteristics of the printing, such as a paper brand ID 701, a paper name 702, weight 703, and surface properties 704. FIG. 7B is one example of paper-feed information stored in the paper information table within the paper information management unit. The paper-feed information shown in FIG. 7B stores a paper-feed 705, a paper size 706, a paper type 707, and a paper brand ID 708. The paper information used in the printing can be acquired by the tables shown in FIGS. 7A and 7B.

Figure 8:
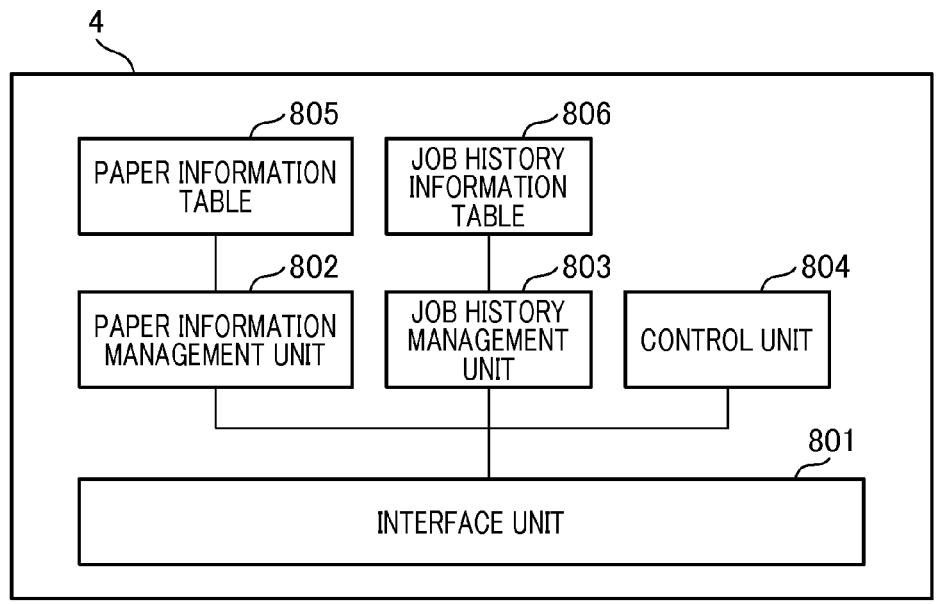
FIG. 8 is a diagram illustrating an exemplary configuration of software of a management client.

FIG. 8 illustrates an exemplary configuration of a function of the management client 4. The management client 4 comprises an interface unit 801, a paper information management unit 802, a job history management unit 803, a control unit 804, a paper information table 805, and a job history information table 806. The interface unit 801 communicates to the image forming apparatuses 2 and 3 via NIC 121 and the network 5, and also communicates to the counting server 7 via the firewall 6.

The paper information management unit 802 acquires paper information from the image forming apparatuses 2 and 3 via the interface unit 801 and stores the information to the paper information table 805. The job history management unit 803 acquires job history information from the image forming apparatuses 2 and 3 via the interface unit 801 and stores the information to the job history information table 806.

The control unit 804 receives a request from the computer 1, and the image forming apparatuses 2 and 3 via the interface unit 801 to perform control corresponding to the request. Also, the control unit 804 performs an acquisition request to request the job history information or the paper information from the image forming apparatuses 2 and 3 and stores a result of the acquisition to the paper information table 805 and the job history information table 806. The content of the acquisition corresponds to the tables described in FIGS. 7A and 7B and is stored depending on each image forming apparatus. The control unit 804 transmits the job history information and the paper information acquired at fixed intervals to the counting server 7.

Figure 9:
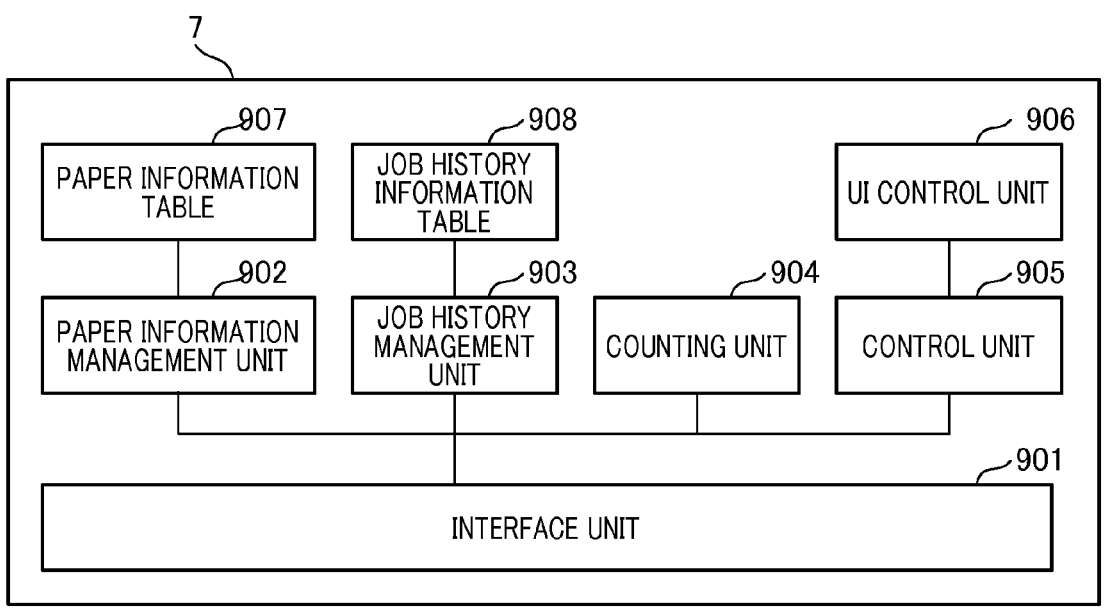
FIG. 9 is a diagram illustrating an exemplary configuration of software of a counting server.

FIG. 9 illustrates an exemplary configuration of the counting server 7. The counting server 7 comprises an interface unit 901, a paper information management unit 902, a job history management unit 903, a count unit 904, a control unit 905, a UI control unit 906, a paper information table 907, and a job history information table 908. The interface unit 901 communicates with the management client 4 via the network 5 and the firewall 6. The paper information management unit 902 manages a paper information table 907 used in the counting. The job history management unit 903 manages a job history transmitted from the management client 4 by the job history information table 908.

The count unit 904 performs counting based on the information stored in the paper information management unit 902 and the job history management unit 903 according to an instruction from the control unit 905. The control unit 905 receives a request from the management client 4 via the interface unit 901 and performs control corresponding to the request. The UI control unit 906 receives an instruction from a display unit (not shown) connected through the interface unit 901 and performs processing corresponding to the instruction.

Figure 10A:
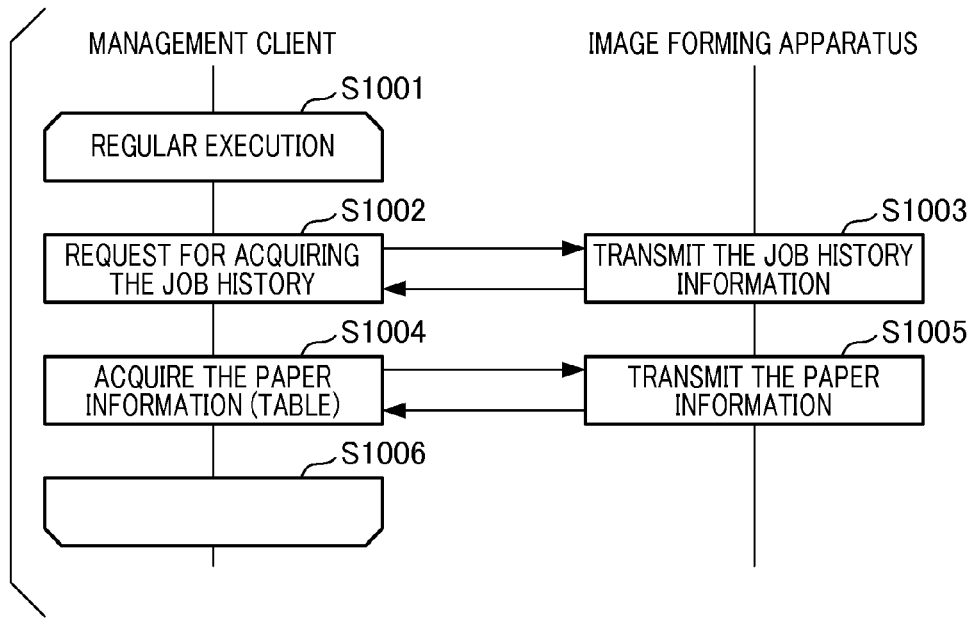
FIGS. 10A and 10B are flow charts illustrating normal processing of a collection and a counting of a job history.
Figure 10B:
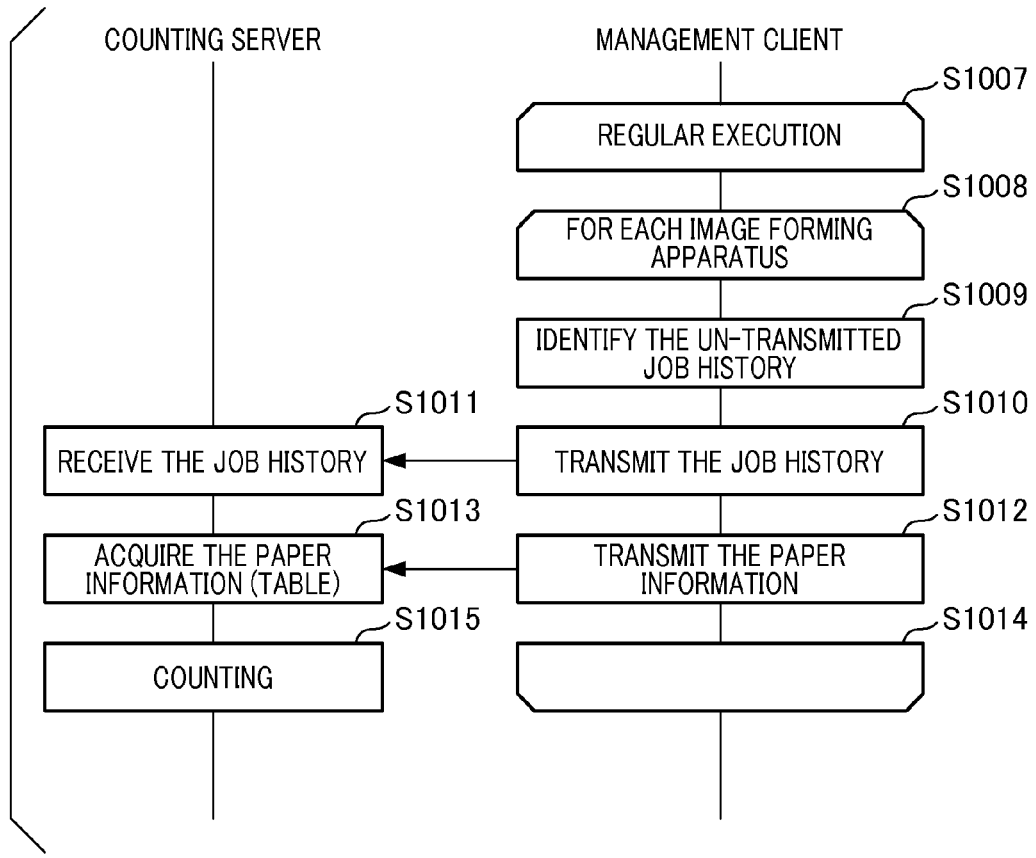

FIGS. 10A and 10B are flow charts illustrating a natural flow in which the management client 4 and the counting server 7 collect a job history from the image forming apparatuses 2 and 3 to perform the counting. FIG. 10A is processing performed on the image forming apparatus by the management client 4, and the processing from S1001 to S1006 is performed at fixed intervals. This processing is independently performed for each image forming apparatus of a counting object connected to the network, however, in the present embodiment, a description will be given of the above processing by using the image forming apparatus 2.

The job history management unit 803 holds a processing interval value in regular processing of S1001. This value may be designated and altered from a management client UI unit (not shown), and may be configured to acquire a schedule setting set in the counting server 7.

When the regular processing is executed, the management client 4 performs an acquisition request to request the job history from the image forming apparatus 2 (step 1002). In this processing, the control unit 804 notifies the image forming apparatus 2 about the largest job identification number in the job identification number 604 that has been acquired in the job history management unit 803. When the image forming apparatus 2 receives an acquisition request for the job history, it transmits the job history record having a numerical value larger than the received identification number to the management client 4 (S1003). The management client 4 stores the received job history information in the job history information table 806.

Then, the control unit 804 of the management client 4 performs an acquisition request to request the image forming apparatus 2 for the paper information to (S1004). The image forming apparatus 2 transmits the paper information stored in the paper information table in response to the acquisition request (S1005). The control unit 804 updates the paper information table 805 by using the acquired paper information.

FIG. 10B is processing executed on the counting server 7 by the management client 4, and the processing from S1007 to S1013 is performed at fixed intervals. This regular processing is performed independent of that in FIG. 10A. The value of the processing interval in the regular processing of S1007 may be designated from a management client UI unit (not shown) and may be configured to acquire a schedule setting set in the counting server 7. Also, in an embodiment of the present invention, although the processing from S1008 to S1012 is performed for each image forming apparatus, based on the interval designated by the step 1007, the processing may have a form comprising a regular processing interval for each image forming apparatus.

In S1009, the job history management unit 803 identifies a job history record not transmitted to the counting server 7. Then, the corresponding job history record is converted to a required transmission format to be transmitted to the counting server 7 (S1010). When the control unit 905 of the counting server 7 receives a job history in S1011, it stores the job history in the job history information table 908. Next, the management client 4 transmits the content of the paper information table 805 to the counting server 7 via the paper information management unit 802 (S1011). The counting server 7 acquires the paper information from the management client 4 and updates the paper information table 907 with the acquired paper information (S1013). Then, in S1015, the count unit 904 executes the counting processing of the job based on the job history information and the paper information.

Figure 11:
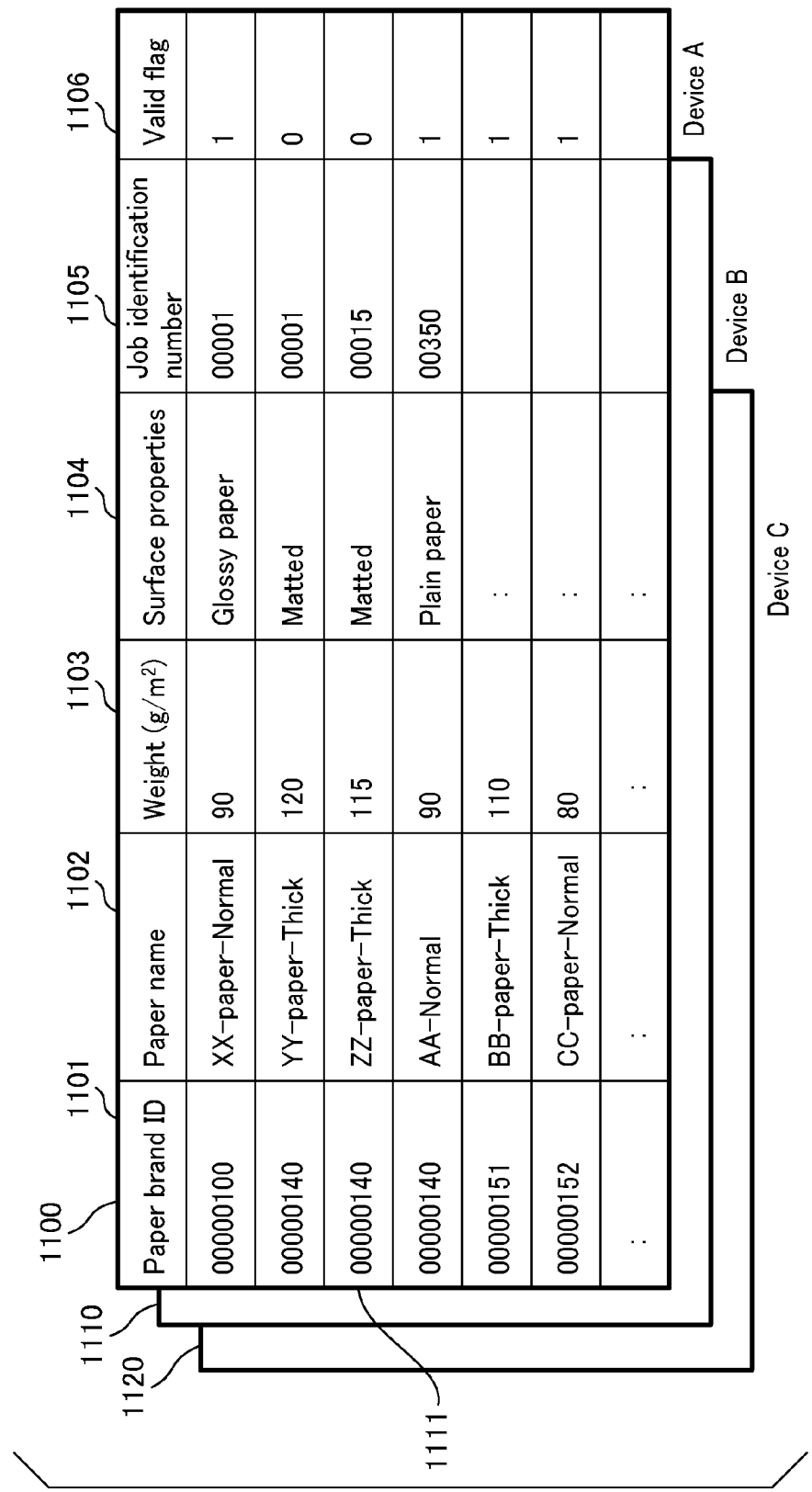
FIG. 11 is an example of a paper information table in the counting server.

FIG. 11 illustrates an example of a paper information table managed by the paper information management unit 902 of the counting server 7. A paper information table 1100 is a table illustrating paper information for one image forming apparatus, and comprises tables 1110 and 1120 for each image forming apparatus. Each table stores a paper brand ID 1101, a paper name 1102, weight 1103, surface properties 1104, and those correspond to the paper brand ID 701, the paper name 702, the weight 703, the surface properties 704 in FIGS. 7A and 7B. Also, the table as shown in FIG. 11 stores a job identification number 1105 and a valid flag 1106.

A description will be given of the meaning of the job identification number 1105 in the paper information table in FIG. 11. When the job history that includes the paper brand ID 00000140 is counted with reference to FIG. 1, the job identification numbers from 00001 to 00014 are set as "YY-paper-Thick". Also, the job identification numbers from 00015 to 00349 are set as "ZZ paper-Thick". And then, the corresponding job identification 350 and the job identifier after the corresponding job identification 350 are set as "AA-Normal".

Also, the job identified by the job identification number 1105 may include a plurality of paper brand IDs. For example, among the jobs identified by the job identification number 00001, if the paper brand ID includes 00000140 and 00000100, a plurality of records with the same identification numbers are stored as shown in FIG. 11.

The valid flag 1106 is a flag illustrating the latest paper information in the corresponding image processing apparatus in the processing for altering the paper information as described below in FIG. 12. Example of FIG. 11 illustrates that a device A is in a state in which "AA-Normal" is managed with the paper brand ID 00000140 and the record with the same paper brand ID 00000140 is not the current stored paper. In the counting processing, the paper name is identified, while the paper brand ID in the job history is collated with the paper brand ID 1101 described in the paper information table 907 to perform the counting.

Figure 12:
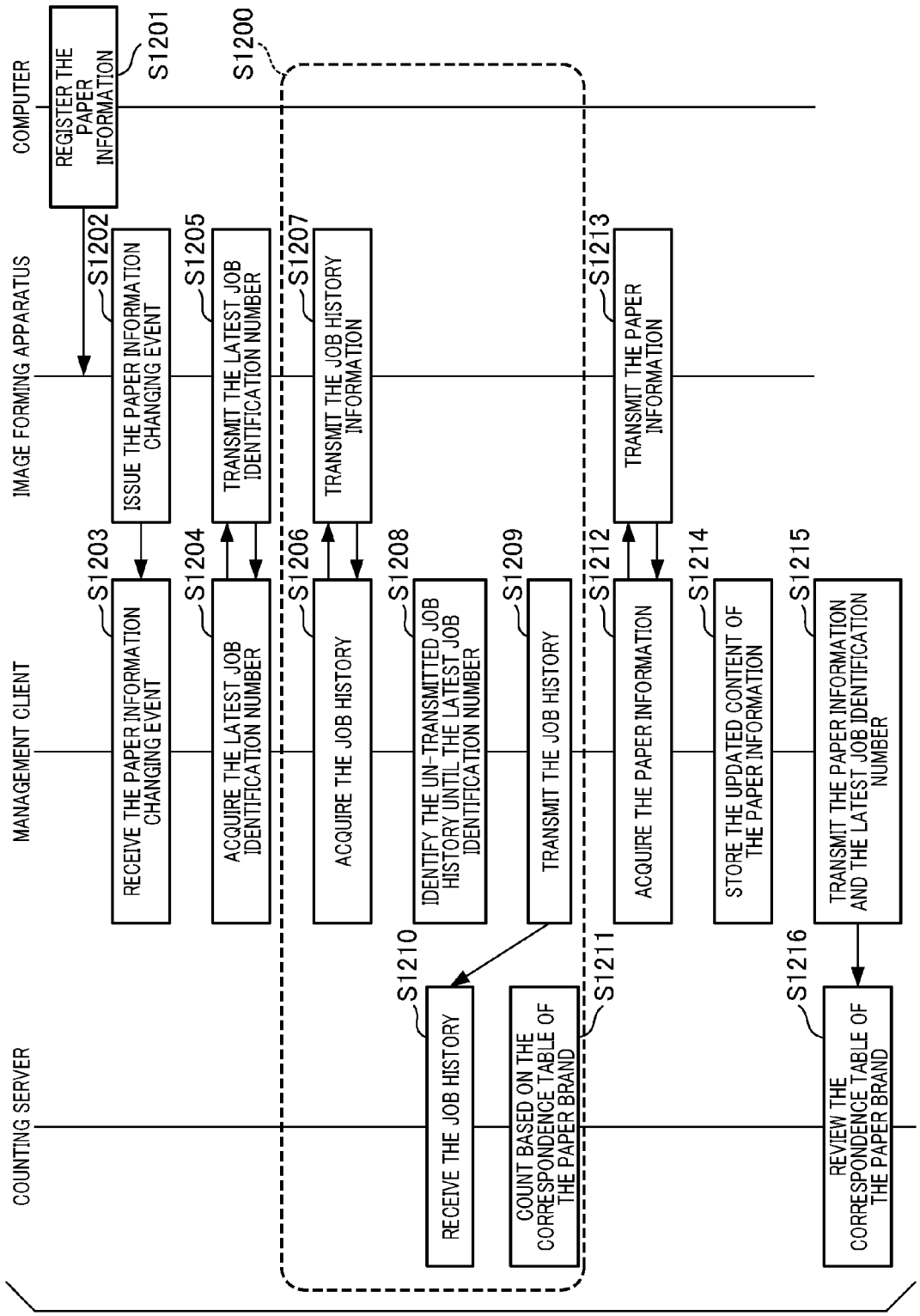
FIG. 12 is a flow chart illustrating a flow of processing at an updating of the paper information.

FIG. 12 is a flow chart illustrating processing during the updating of the paper information. In the flow chart shown in FIG. 12, CPUs 101 and 301 in each apparatus loads a program stored in ROMs 103 and 303 or HDDs 111 and 311 to RAMS 102 and 302 to be executed and then, each type of function is realized as shown in FIGS. 4, 5, 8, and 9. The image forming apparatus 2 receives a registration instruction from the computer 1 via the interface unit 501 (S1201). Note that the registration processing of the paper information may be performed on the image forming apparatus via the UI control unit 510 or the remote UI control unit 511 of the image forming apparatus 2.

The image forming apparatus 2 updates the paper information table in the paper information management unit 513 by the registration of the paper information, and while issuing an event denoting that the paper information table has been updated (S1202). Note that the image forming apparatus 2 performs control such that the registration instruction of the paper information does not execute the processing by the registration instruction during the execution of the job.

When the management client 4 receives a paper information table changing event (S1203), it requests the image forming apparatus that issues the image information table changing event (S1204) for the latest job identification number that the job has completed. The image forming apparatus 2 returns the latest job identification number for which the execution has been completed and that is managed in the job history management unit 509 to the management client 4 (S1205). The latest job identification number is the job identification number that has the largest value among the job identification number that have been issued for each job, and is particular information for identifying the latest job history in the plurality of the job histories recorded by the image forming apparatus 2.

Note that the image forming apparatus 2 may be configured to comprise the job identification number for which the job has been completed when issuing the paper information changing event. In this case, the request for the latest job identification number for which the job has been completed (S1204) and the processing for returning the latest job identification number (S1205) may not be performed.

Hereinafter, a description will be given of a processing group 1200 from S1206 to S1210. The management client 4 for acquiring the latest job identification number for which the paper information changing event and the job have been completed from the image forming apparatus 2 holds the latest job identification number in the job history management unit 803. Then, the management client 4 performs an acquisition request to request the image forming apparatus 2 for the job history (S1206). In this processing, the control unit 804 provides notification about the job identification number 604 previously acquired from the image forming apparatus 2, from the job history management unit 803. When the image forming apparatus 2 receives an acquisition request for the job history, the record of the job history with the latest job identification number is transmitted from the job history with the job identification number larger than the received identification number to the management client 4 (S1207).

Next, in S1208, the job history management unit 803 identifies the job history record that should be transmitted to the counting server 7. More specifically, it identifies the job history up to the latest job identification number acquired by the processing of S1204 among the job history records that have not been transmitted to the counting server 7 as the job history record that should be transmitted to the counting server 7. Thereby, the job history record before the job identification number acquired in the processing of S1204, which is a number of sheets of paper used for each paper name, can be counted by associating it with the paper brand ID before changing the paper information. Then, the corresponding job history record is converted to the required transmission format, and then transmitted to the transmission counting server 7 (S1209). When the counting server 7 receives the job history from the management client 4 (S1210), the counting processing is performed based on the paper information managed in the paper information table 907 (S1211).

Figure 13:
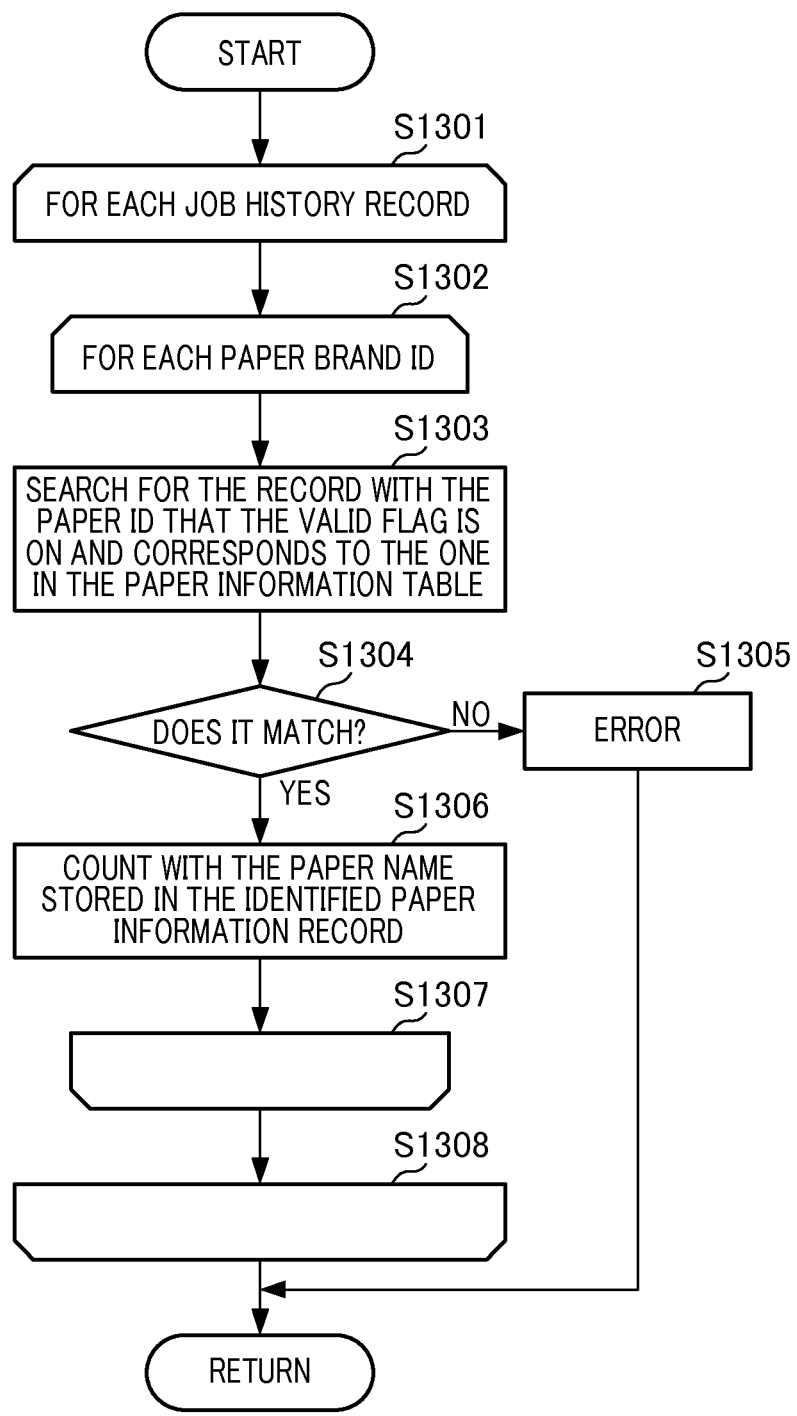
FIG. 13 is a flow chart illustrating a method for collecting a job history according to the first embodiment.

FIG. 13 is a flow chart illustrating a method for counting a job history based on the paper information table 907 in S1211. The counting server 7 performs counting processing on each record of the job history received in S1210 (steps S1301 to S1308). Also, since a plurality of types of paper can be used in one job, the counting server 7 performs the counting processing on each paper brand ID included in the job history record of interest (step S1302 to S1307).

Firstly, the count unit 904 of the counting server 7 identifies a paper information record with a flag that is valid and the same as the acquired paper brand ID, referring to the paper brand ID 1101 and the valid flag 1106 of the paper information table (S1303). Next, in S1304, if there is not a matched record in the step, the processing proceeds to S1305 and the count unit 904 performs error processing to complete the processing. If there is a matched record, the count unit 904 performs the counting processing on the corresponding paper name with respect to the paper information record (S1306).

Returning to the explanation of FIG. 12. When the transmission of the job history by the management client 4 has completed, the acquisition request that requests the image forming apparatus 2 for the paper information is performed (S1212). Then, the image forming apparatus 2 transmits the latest paper information table managed by the paper information management unit 513 to the management client 4 (S1213). In other words, the management client 4 acquires the updated paper name and the paper brand identifier after counting the number of the used sheets of paper for each paper name before the update. Then, the management client 4 updates the paper information table 805 by using the updated paper information (S1214). Then, the management client 4 transmits the acquired paper information and the latest job identification number acquired in S1204 to the counting server 7 (S1215). The counting server 7 updates the paper information table 907 based on the received paper information and the latest job number to complete the processing.

As described above, according to the job management system of the present invention, even if detailed paper information is altered, the correct counting of the job log for each paper brand can be performed. By acquiring the job identification number for which the processing has been completed when altering the paper, the update of the paper information can be reflected and changed in the job history without inconsistency to realize the correct counting with respect to the paper name, while collecting the job history at fixed intervals. Note that in an example shown in FIG. 12, the job history is transmitted via the management client to the counting server. However, it may be directly transmitted from the image forming apparatus to the counting server if the paper brand information is managed in the management client.

Second Embodiment

In the first embodiment, a description is given of the processing for performing the execution of the processing group 1200 in FIG. 12 and the identification of the paper name by using the valid flag 1106 in FIG. 13, and performing the counting for each paper name. In a second embodiment, a description will be given of a method for performing the counting for each paper name without executing the processing group 1200 in FIG. 12.

Figure 14:
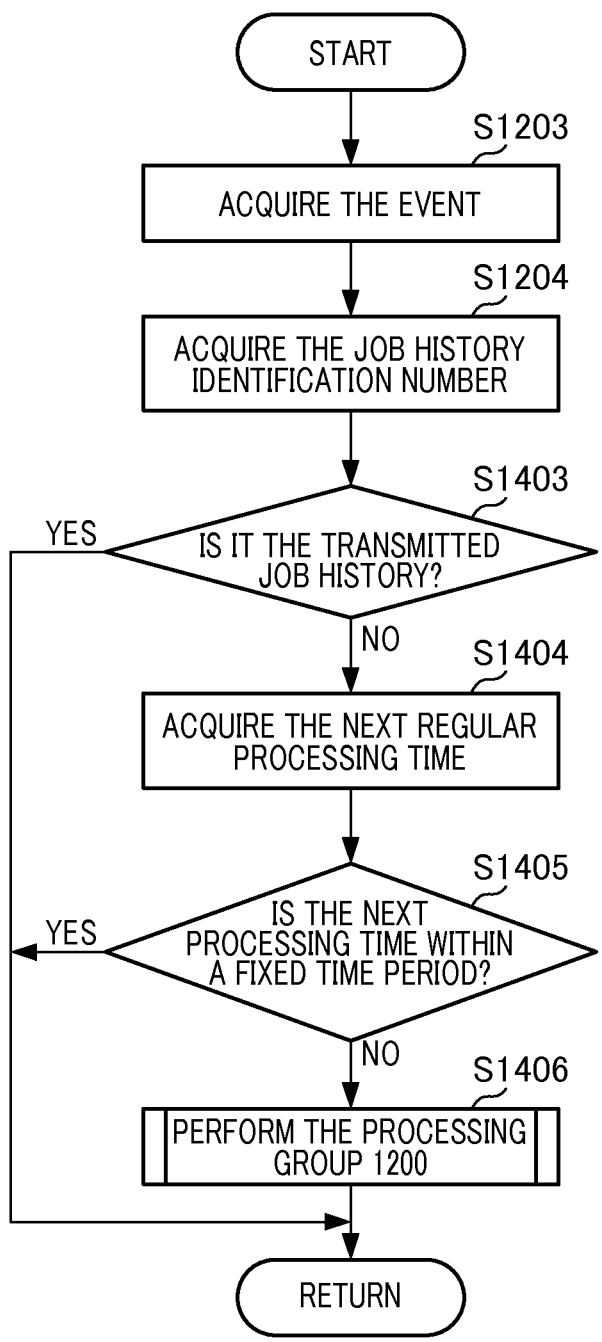
FIG. 14 is a flow chart for determining whether processing is performed or not.

FIG. 14 is one example of a flow chart for determining whether the processing group 1200 in FIG. 12 is performed or not. The processing of S1203, S1204, and S1406 are the same as that in FIG. 12, and thus, a description thereof will be omitted. In S1403, the management client 4 completes the processing if the latest job identification number acquired from the image forming apparatus 2 is an identifier corresponding to the job history that has been acquired. If it is not the corresponding identifier, the processing proceeds to S1404, and the management client 4 confirms the time for acquiring the next regular job history. This acquiring time can be calculated by using the value of processing interval in the regular processing of S1001 in FIGS. 10A and 10B.

Next, in S1405, the management client 4 determines whether a time until the acquisition of the regular job history is in a constant time or not. If the time is in the constant time, the management client 4 does not perform the processing group 1200 as the acquisition of the job history is performed in the processing for acquiring the regular job history in FIG. 9 (S1002). On the other hand, if it is not a constant time, the processing group 1200 is executed (S1406). Thereby, the inquiring time of the job history from the management client 4 to the image forming apparatus can be reduced to reduce the load of the network.

Figure 15:
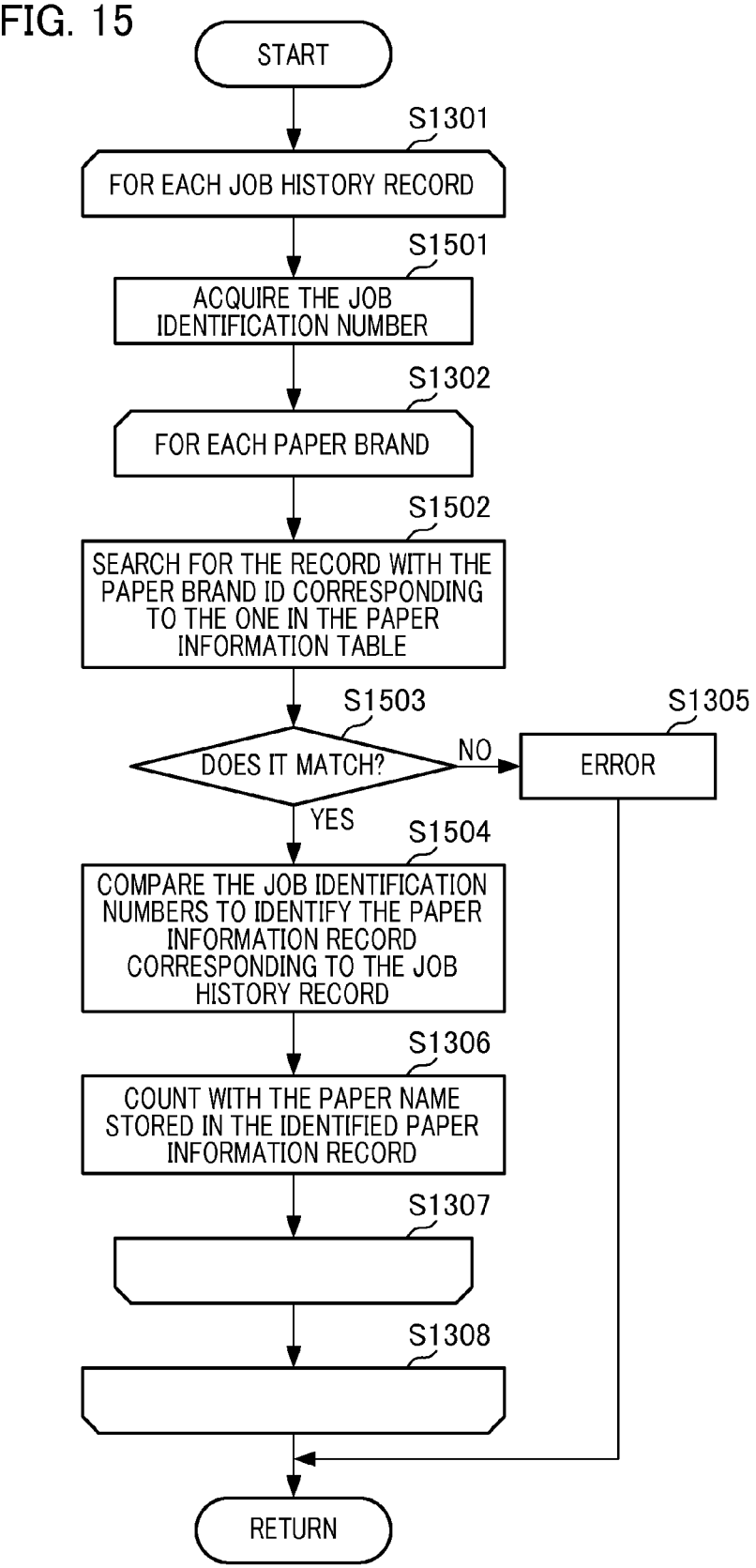
FIG. 15 is a flow chart illustrating a method for counting a job history according to a second embodiment.

FIG. 15 is a flow chart illustrating a method of the counting processing of the job history based on the paper information table 907 (S1211) according to the second embodiment.

Here, only a description will be given of components that are different from those of the processing described in FIG. 13. In S1501, the count unit 904 acquires a job identification number of interest. This number is used to perform the mapping to the paper information record in the following steps. Next, in S1502, the count unit 904 searches the paper information record including the paper brand ID of interest included in the job history of interest from the paper information table 907.

In S1503, if there is no matched record, the processing proceeds to S1305, and the counting 904 performs the error processing and completes the processing. If there is the matched record, the processing proceeds to S1504. In S1504, the count unit 904 uses the job identification number acquired in S1501 to identify the paper information record corresponding to the job history record. More specifically, the count unit 904 compares the acquired job identification number with the job identification number 1105 in the paper information table to identify the corresponding paper information record.

A description will be given of processing 1100 in FIG. 11 as illustrated. In S1502, the job identification number acquires the job history record 00100, and if the record includes the paper brand ID 00000140, the record in the corresponding paper information table is set as 1111, as in the same drawing. This processing is caused by the determination that the job identification number in which the same record is valid has a range of 00015 to 000349. Next, the counting processing is performed for the paper name on the identified paper information record (S1306).

Third Embodiment

In the previous embodiments, a description is given of the counting method to the image forming apparatus in which the paper brand information is recorded as the paper brand ID in the job history. In contrast, without the paper brand ID in the job history information, the image forming apparatus can acquire only paper type information for classifying the paper as "plain paper", "cardboard", and "recycled paper" from the job history. However, there is a demand for realizing a meaningful counting even in a mixed-device environment with a device including the paper brand information in the job history and a device not including the paper brand information in the job history.

For example, the above demand corresponds to the case in which the image forming apparatus 3 in FIG. 1 does not include the paper brand information in the job history. In such an environment, there is a proposed method that counts by holding information corresponding to the paper brand and the paper type in the image forming apparatus that does not include the paper brand ID in the job history information.

Figure 16:
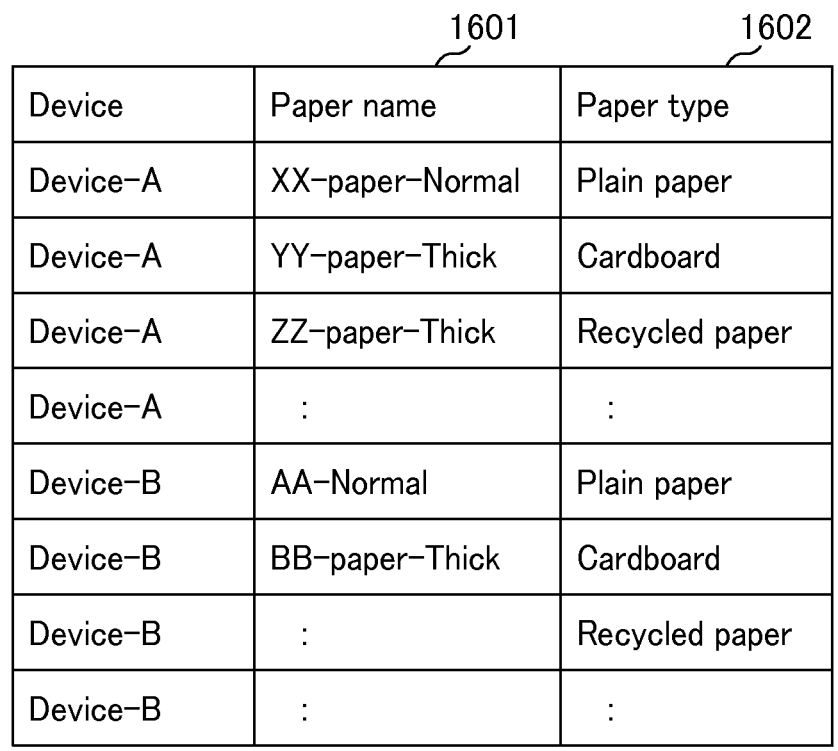
FIG. 16 is an example of a correspondence table of a paper brand according to a third embodiment.
Figure 17:
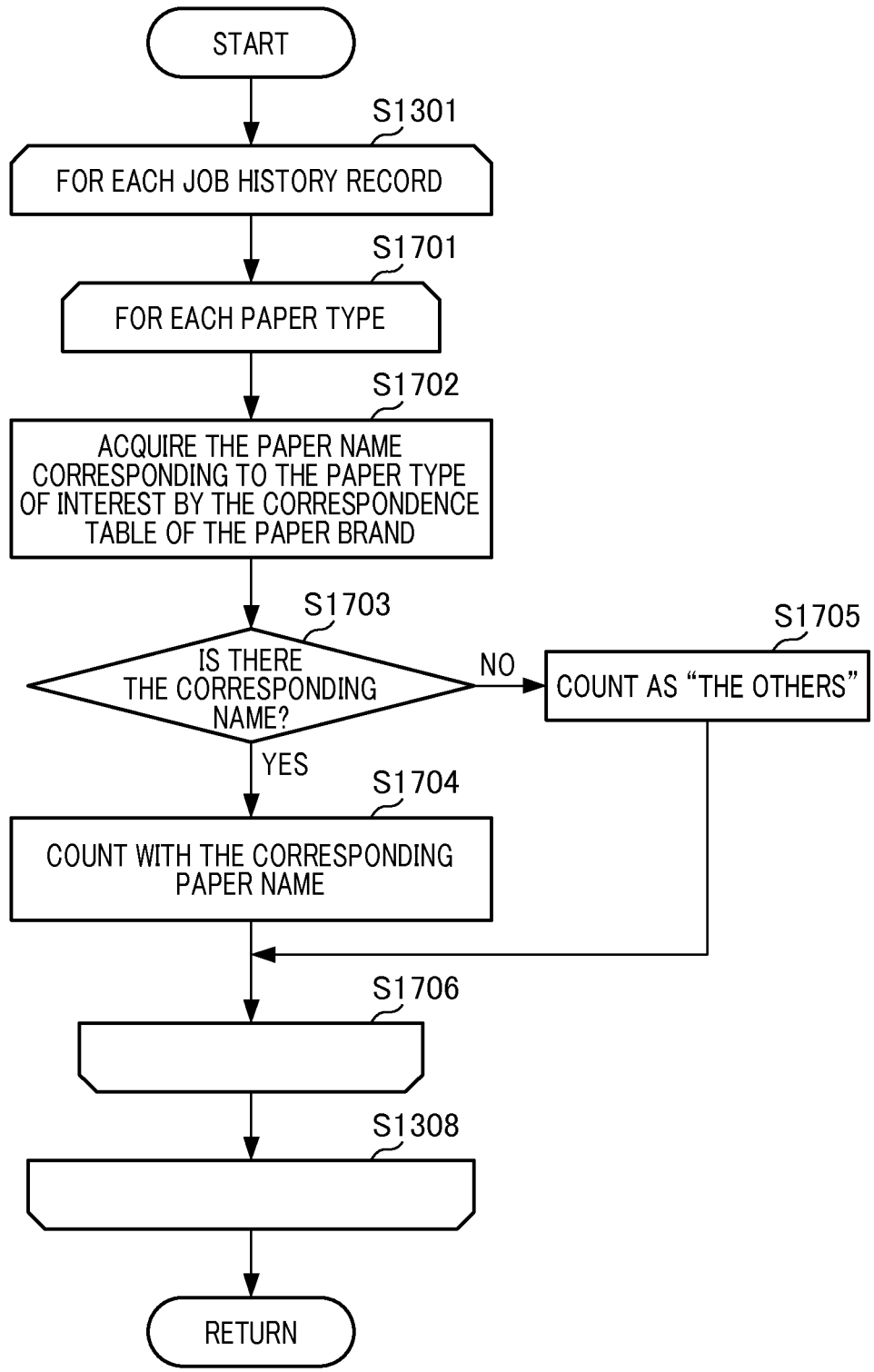
FIG. 17 is a flow chart illustrating a method for counting a job history according to the third embodiment.

FIG. 16 is one example of a correspondence table of the paper brand for the association between the paper brand and the paper type. The paper information management unit 902 of the counting server 7 holds a correspondent relationship between a paper name 1601 and paper type information 1602 for each image forming apparatus. The counting server 7 performs processing based on the flow chart as shown in FIG. 17 in the counting processing on the image forming apparatus 3. In this embodiment, a description will be given of only components different from those of the flow chart in FIG. 13 according to the first embodiment.

Since a plurality of paper types can be used in one job, the count unit 904 performs processing on each paper type included in the job history record of a counting object (S1701 to S1706). Firstly, a paper name corresponding to the paper type of the counting object is acquired from the correspondence table of the paper brand (S1702). Next, in S1703, if the corresponding paper name is found from the correspondence table of the paper brand, the processing proceeds to S1704 and performs the counting processing by using the matching paper name. In contrast, if the paper name is not found, the processing proceeds to S1705 and performs the counting processing for classifying the unmatched paper name as "the others".

Figure 18:
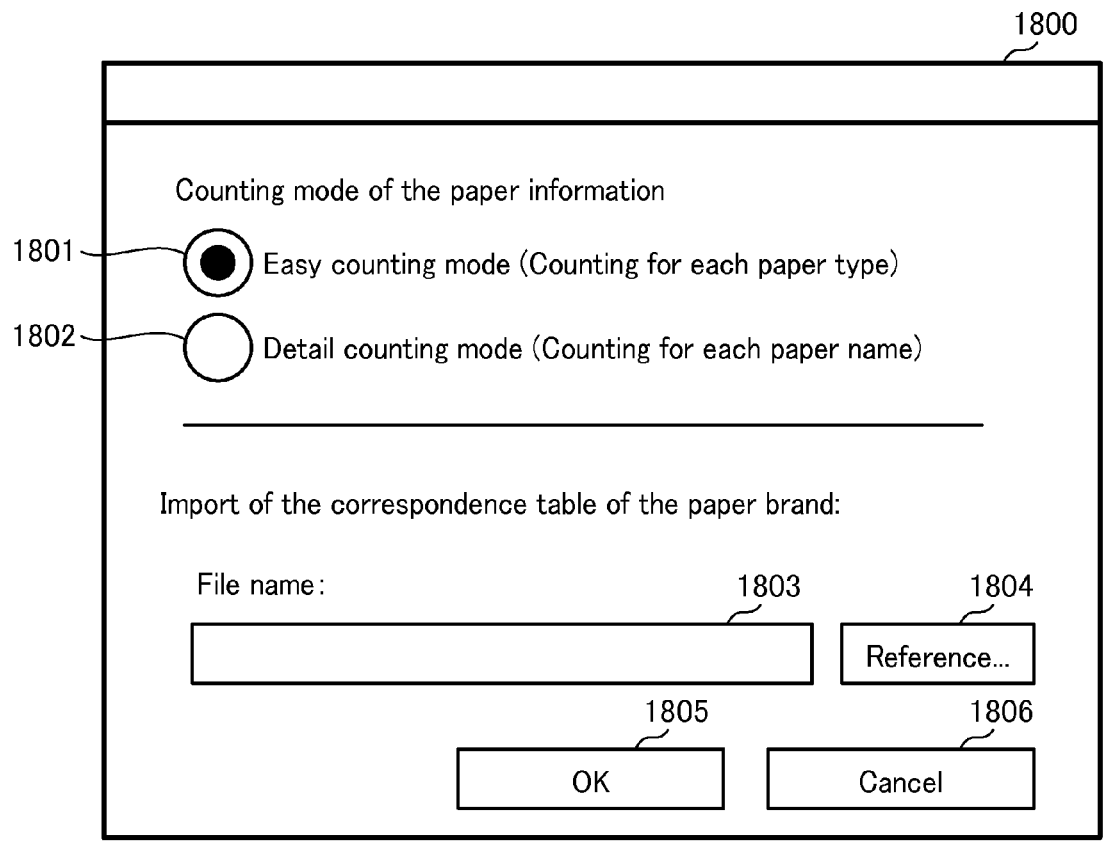
FIG. 18 is an example of a user interface for acquiring the correspondence table of the paper brand.

FIG. 18 is an example of a user interface 1800 for acquiring the correspondence table of the paper brand by the counting server 7. An image as shown in FIG. 18 comprises a counting for each paper type 1801, a counting for each paper name 1802, a file name input unit 1803, reference 1804, an OK button, and a canceling button 1806. A user can select a counting mode for each paper type or each paper name. In the counting for each paper type 1801, counting by using the paper type of the job history considering all of the image forming apparatuses is performed. Also, in counting of each paper name 1802, the processing described in the first embodiment and the second embodiment is performed in the device including the paper brand information in the job history. Then, in the device not including the job brand information in the job history, the mapping processing described in FIG. 16 is performed and the counting for each paper name is performed. The file name input unit 1803 is used to import a file including the content illustrated in FIG. 15. The import format may be, for example, a CSV file, but the mode is not especially limited.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-019764, filed Feb. 4, 2014, which is hereby incorporated by reference wherein in its entirety.

What is claimed is:

1. A job management system that includes an image forming apparatus and a management system for managing job history information,
wherein the image forming apparatus comprises:
at least one processor and a memory constructed to function as:
a managing unit configured to associate a paper brand identifier with a paper name to be managed in a database;
a recording unit configured to record a number of sheets of paper used in a job executed by the image forming apparatus for each paper brand identifier as a job history;
a first notifying unit configured to notify the management system about identifying information for identifying the latest job history in a plurality of job histories recorded by the recording unit in a case of updating of the paper brand identifier and the paper name in the database;
a second notifying unit configured to notify the management system about the updated paper name and the paper brand identifier; and
a transmitting unit configured to transmit the job history information with the plurality of job histories recorded by the recording unit to the management system, and
wherein the management system comprises:
at least one processor and a memory constructed to function as:
a managing unit configured to associate the paper name with the paper brand identifier of the image forming apparatus to be managed based on a notification from the image forming apparatus; and
a counting unit configured to count the number of sheets of paper used for each paper name before the update by using the job history information and the identifying information.

2. The job management system according to claim 1,
wherein the identifying information is a job identification number issued for each job, and
wherein the first notifying unit notifies the management system about the latest job identification number.

3. The job management system according to claim 2,
wherein the counting unit transmits the largest value of the job identification number in the acquired job identification number to the image forming apparatus in providing notification about the latest job identification number, and
wherein the transmitting unit transmits the job history information relating to the latest job identification number from the job identification number with a value larger than that of the acquired job identification number to the management system.

4. The job management system according to claim 1,
wherein the counting unit respectively counts the number of sheets of paper executed with the paper of the paper name associated with a plurality of paper brand identifiers included in the job history information of one executed job, if the executed job comprises the plurality of paper brand identifiers.

5. The job management system according to claim 1,
wherein the managing unit of the management system acquires the updated paper name and paper brand identifier after counting the number of sheets of used paper for each paper name before the update.

6. The job management system according to claim 1,
wherein the management system further comprises:
a counting server with the counting unit; and
a management client with the managing unit, and
wherein the transmitting unit directly transmits the job history information to the counting server without passing through the management client.

7. An image forming apparatus that transmits job history information to a job management system that includes a management system for managing the job history information, the image forming apparatus comprising:
at least one processor and a memory constructed to function as:
a managing unit configured to associate a paper brand identifier with a paper name to be managed in a database;
a recording unit configured to record a number of sheets of paper used in a job executed by the image forming apparatus for each paper brand identifier as a job history;
a first notifying unit configured to notify the management system about identifying information for identifying the latest job history in a plurality of job histories recorded by the recording unit in a case of updating of a corresponding relationship between the paper brand identifier and the paper name in the database;
a second notifying unit configured to notify the management system about the updated paper name and the paper brand identifier; and
a transmitting unit configured to transmit the job history information with the plurality of job histories recorded by the recording unit to the management system,
wherein the management system counts the number of sheets of paper used for each paper name before the update by using the job history information and the identifying information.

8. A control method in a job management system that includes an image forming apparatus and a management system for managing job history information, the method comprising:
associating, by the image forming apparatus, a paper brand identifier with a paper name in a database;
recording, by the image forming apparatus, a number of sheets of paper used in an executed job as a job history for each paper brand identifier;
notifying, by the image forming apparatus, the management system about identifying information for identifying the latest job history in a plurality of job histories recorded in the recording in a case of updating of the paper brand identifier and the paper name in the database;
notifying, by the image forming apparatus, the management system about the updated paper name and the paper brand identifier;
transmitting, by the image forming apparatus, the job history information with the plurality of job histories recorded in the recording to the management system;
associating, by the management system, the paper brand identifier with the paper name of the image forming apparatus to be managed based on the notification from the image forming apparatus; and
counting, by the management system, the number of sheets of paper used for each paper name before the update by using the job history information and the identifying information.

9. A control method of an image forming apparatus that transmits job history information to a job management system that includes a management system for managing the job history information, the method comprising:

associating a paper brand identifier with a paper name to be managed in a database;

recording a number of sheets of paper used in a job executed by the image forming apparatus for each paper brand identifier as a job history;

notifying the management system about identifying information for identifying the latest job history in a plurality of job histories recorded by the recording unit in a case of updating of the paper brand identifier and the paper name in the database;

notifying the management system about the updated paper name and the paper brand identifier; and transmitting the job history information with the plurality of job histories recorded by the recording unit to the management system, wherein the management system counts the number of sheets of paper used for each paper name before the update by using the job history information and the identifying information.

10. A non-transitory storage medium storing a readable program for causing a computer to execute a controlling method executed in a job management system that includes an image forming apparatus and a management system for managing job history information, the method comprising:

associating, by the image forming apparatus, a paper brand identifier with a paper name in a database;

recording, by the image forming apparatus, a number of sheets of paper used in an executed job as a job history for each paper brand identifier;

notifying, by the image forming apparatus, the management system about identifying information for identifying the latest job history in a plurality of job histories recorded in the recording in a case of updating of the paper brand identifier and the paper name in the database;

notifying, by the image forming apparatus, the management system about the updated paper name and the paper brand identifier;

transmitting, by the image forming apparatus, the job history information with the plurality of job histories recorded in the recording to the management system;

associating, by the management system, the paper brand identifier with the paper name of the image forming apparatus to be managed based on the notification from the image forming apparatus; and counting, by the management system, the number of sheets of paper used for each paper name before the update by using the job history information and the identifying information.

* * * * *